US010538203B2

(12) United States Patent
Wesley et al.

(10) Patent No.: US 10,538,203 B2
(45) Date of Patent: Jan. 21, 2020

(54) INTERIOR REARVIEW MIRROR ASSEMBLY WITH INDICATOR

(71) Applicant: MAGNA MIRRORS OF AMERICA, INC., Holland, MI (US)

(72) Inventors: Mitchell J. Wesley, Wyoming, MI (US); Kenneth C. Peterson, Ada, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 16/154,954

(22) Filed: Oct. 9, 2018

(65) Prior Publication Data
US 2019/0106059 A1 Apr. 11, 2019

Related U.S. Application Data

(60) Provisional application No. 62/570,210, filed on Oct. 10, 2017.

(51) Int. Cl.
*B60R 1/02* (2006.01)
*B60R 1/12* (2006.01)
*B60R 1/04* (2006.01)
*B60Q 3/70* (2017.01)
*B60Q 3/258* (2017.01)
*F21W 106/00* (2018.01)
*F21Y 115/10* (2016.01)

(52) U.S. Cl.
CPC ............ *B60R 1/1207* (2013.01); *B60Q 3/258* (2017.02); *B60Q 3/70* (2017.02); *B60R 1/04* (2013.01); *F21W 2106/00* (2018.01); *F21Y 2115/10* (2016.08)

(58) Field of Classification Search
CPC ......... B60R 1/1207; B60R 1/04; B60Q 3/258; B60Q 3/70; F21Y 2115/10; F21W 2106/00
See application file for complete search history.

(56) References Cited

U.S. PATENT DOCUMENTS

| 4,712,879 A | 12/1987 | Lynam et al. |
| 4,793,690 A | 12/1988 | Gahan et al. |
| 5,066,112 A | 11/1991 | Lynam et al. |
| 5,073,012 A | 12/1991 | Lynam |
| 5,076,673 A | 12/1991 | Lynam et al. |
| 5,115,346 A | 5/1992 | Lynam |

(Continued)

*Primary Examiner* — An T Nguyen
(74) *Attorney, Agent, or Firm* — Honigman LLP

(57) ABSTRACT

An interior rearview mirror assembly for a vehicle includes a mirror casing, a mirror reflective element disposed at the mirror casing, and an indicator disposed at the mirror reflective element. The mirror reflective element and mirror casing are adjustably mounted at an interior portion of a vehicle via a mounting structure. The indicator includes a plurality of light emitting diodes, with each light emitting diode of the plurality of light emitting diodes being individually operated to emit light of a particular color. Responsive to one of a plurality of triggers, the indicator electrically powers a particular one or particular ones of the light emitting diodes for that trigger. The indicator electrically powers the particular one or ones of the light emitting diodes to emit light of one or more colors to convey colored information associated with that trigger to a driver of the vehicle.

22 Claims, 16 Drawing Sheets

(56) References Cited

U.S. PATENT DOCUMENTS

| | | |
|---|---|---|
| 5,140,455 A | 8/1992 | Varaprasad et al. |
| 5,142,407 A | 8/1992 | Varaprasad et al. |
| 5,151,816 A | 9/1992 | Varaprasad et al. |
| 5,193,029 A | 3/1993 | Schofield et al. |
| 5,253,109 A | 10/1993 | O'Farrell et al. |
| 5,285,060 A | 2/1994 | Larson et al. |
| 5,406,414 A | 4/1995 | O'Farrell et al. |
| 5,416,313 A | 5/1995 | Larson et al. |
| 5,525,264 A | 6/1996 | Cronin et al. |
| 5,530,240 A | 6/1996 | Larson et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,910,854 A | 6/1999 | Varaprasad et al. |
| 6,002,511 A | 12/1999 | Varaprasad et al. |
| 6,154,306 A | 11/2000 | Varaprasad et al. |
| 6,178,034 B1 | 1/2001 | Allemand et al. |
| 6,329,925 B1 | 12/2001 | Skiver et al. |
| 6,420,975 B1 | 7/2002 | DeLine et al. |
| 6,428,172 B1 | 8/2002 | Hutzel et al. |
| 6,449,082 B1 | 9/2002 | Agrawal et al. |
| 6,690,268 B2 | 2/2004 | Schofield et al. |
| 6,902,284 B2 | 6/2005 | Hutzel et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,370,983 B2 | 5/2008 | DeWind et al. |
| 7,626,749 B2 | 12/2009 | Baur et al. |
| 7,734,392 B2 | 6/2010 | Schofield et al. |
| 7,855,755 B2 | 12/2010 | Weller et al. |
| 8,027,029 B2 | 9/2011 | Lu et al. |
| 8,049,640 B2 | 11/2011 | Uken et al. |
| 8,217,830 B2 | 7/2012 | Lynam |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,890,955 B2 | 11/2014 | Peterson |
| 9,092,986 B2 | 7/2015 | Salomonsson et al. |
| 9,126,525 B2 | 9/2015 | Lynam et al. |
| 9,346,403 B2 | 5/2016 | Uken et al. |
| 9,598,016 B2 | 3/2017 | Blank et al. |
| 2002/0032510 A1* | 3/2002 | Turnbull .......... B60R 1/12 701/49 |
| 2003/0201906 A1* | 10/2003 | Buscemi .......... G08G 1/0965 340/902 |
| 2005/0134447 A1* | 6/2005 | Su .......... B60Q 1/2665 340/463 |
| 2006/0050018 A1 | 3/2006 | Hutzel et al. |
| 2008/0316054 A1* | 12/2008 | Lynam .......... B60Q 1/2665 340/904 |
| 2009/0015736 A1 | 1/2009 | Weller et al. |
| 2010/0097469 A1 | 4/2010 | Blank et al. |
| 2014/0022390 A1* | 1/2014 | Blank .......... B60R 1/12 348/148 |
| 2014/0293169 A1 | 10/2014 | Uken et al. |
| 2014/0313563 A1 | 10/2014 | Uken et al. |
| 2015/0097955 A1 | 4/2015 | De Wind et al. |
| 2017/0297497 A1* | 10/2017 | De Wind .......... B60R 1/12 |

* cited by examiner

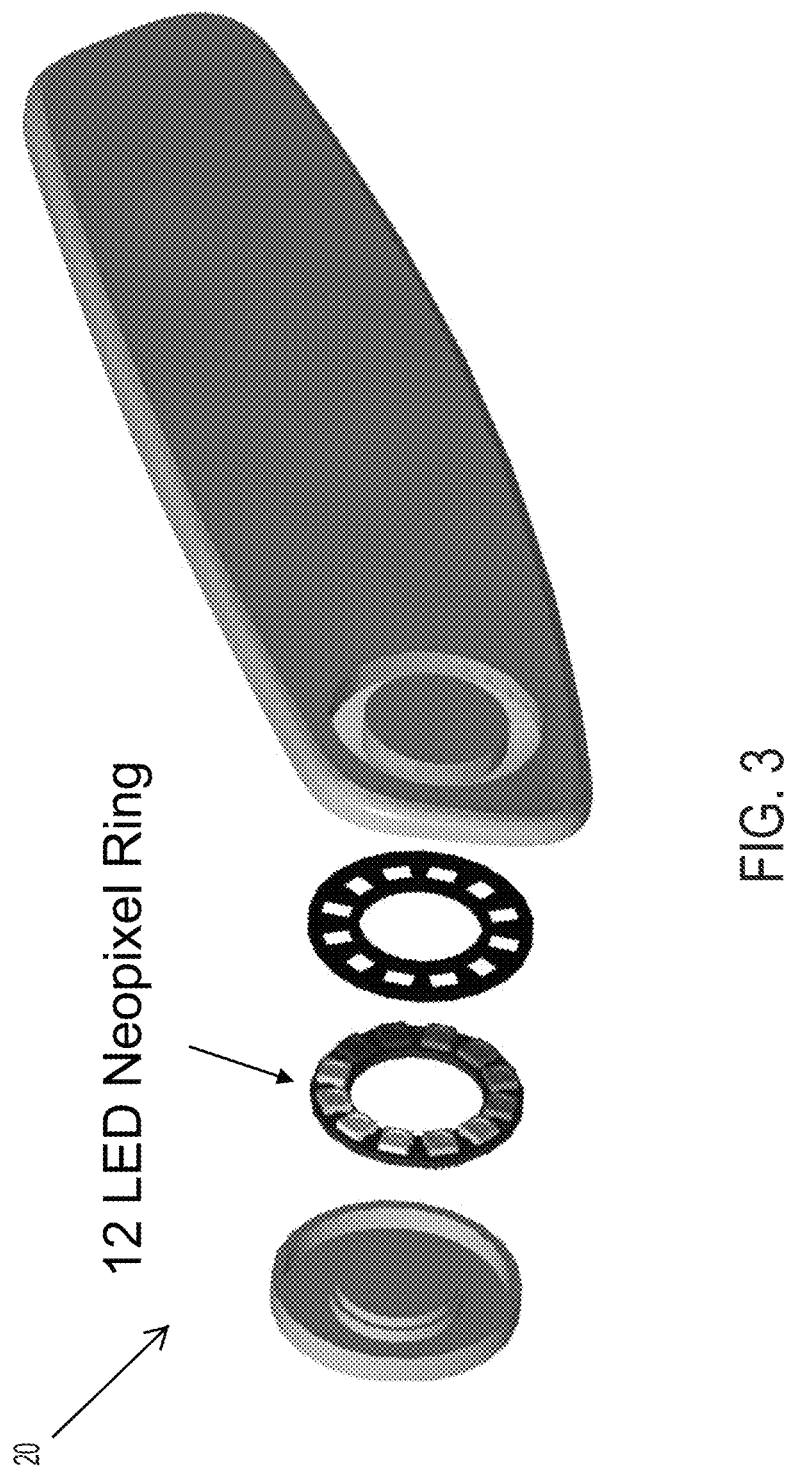

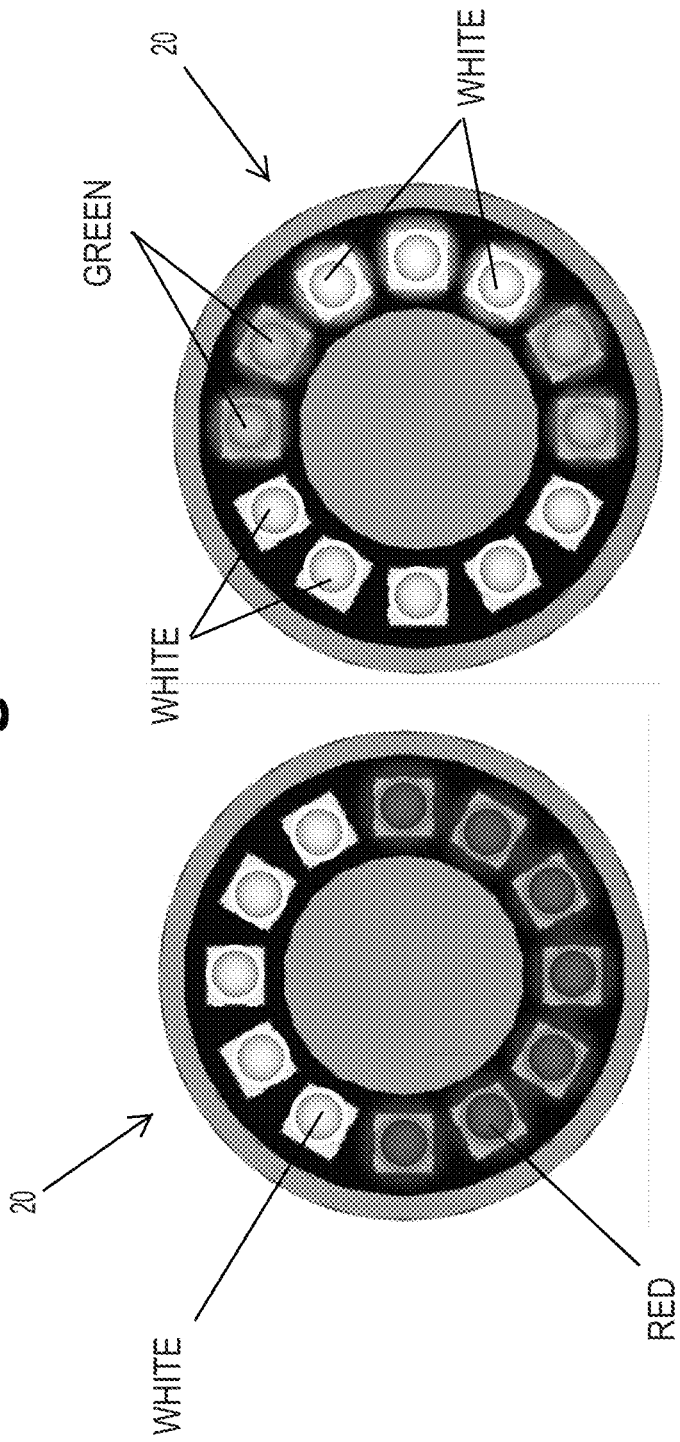

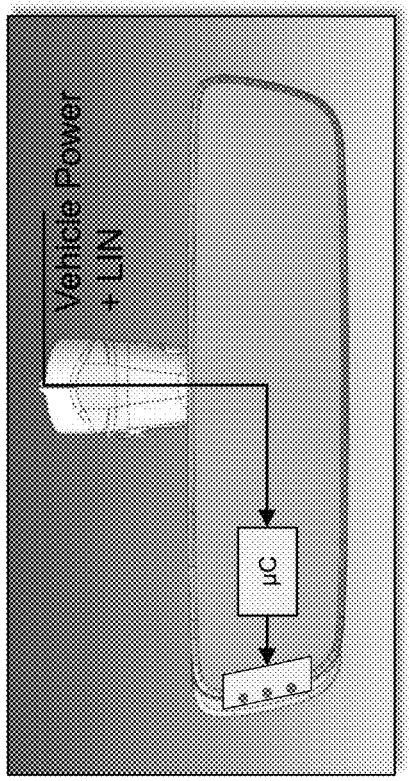
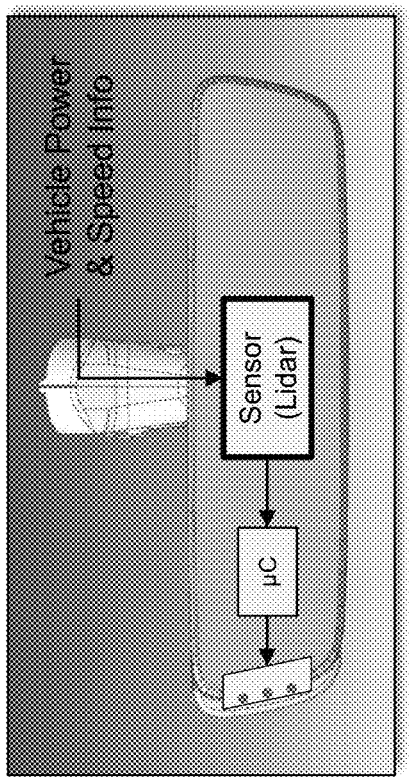
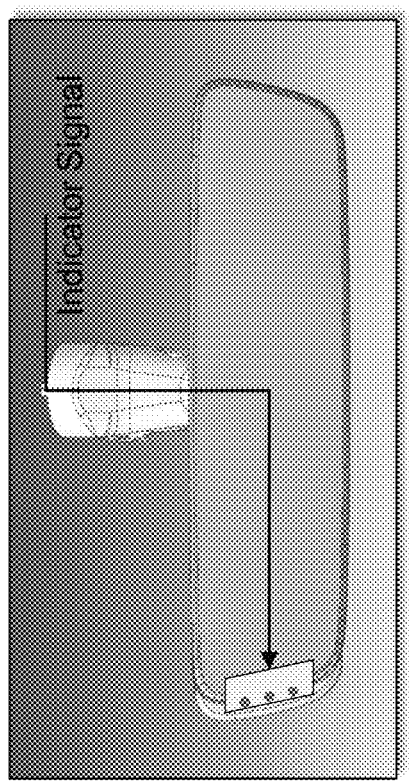
FIG. 14
FIG. 15
FIG. 16

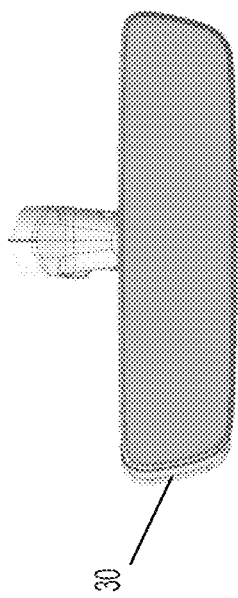
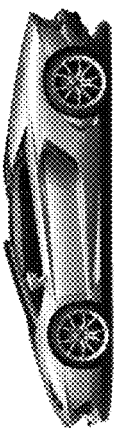
Distance: 20 m
Velocity: 0 m/s
FIG. 18

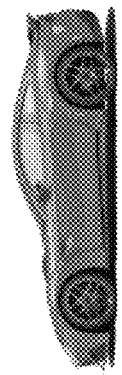
Distance: 18 m
Velocity: 0.5 m/s
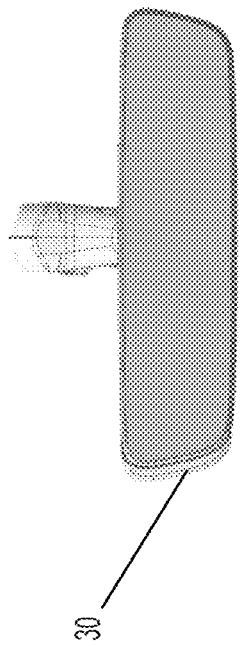
30
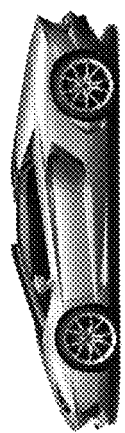
FIG. 19

INTERIOR REARVIEW MIRROR ASSEMBLY WITH INDICATOR

CROSS REFERENCE TO RELATED APPLICATION

The present application claims the filing benefits of U.S. provisional application Ser. No. 62/570,210, filed Oct. 10, 2017, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration.

SUMMARY OF THE INVENTION

The present invention provides an interior rearview mirror assembly that includes an indicator that is operable to indicate various information in the way of selective actuation of a plurality of light emitting diodes (LEDs), where the selected actuation, colors and patterns of the LEDs conveys information to the driver of the vehicle. The indicator actuates or powers various ones of the LEDs to emit an appropriate or selected or predetermined color (or colors) that provide the desired message or information associated with one or more trigger or input (such as, for example, actuation of a turn signal indicator of the vehicle, receipt of an input from a blind zone detection system of the vehicle, a door unlock or door lock signal and/or the like)

These and other objects, advantages, purposes and features of the present invention will become apparent upon review of the following specification in conjunction with the drawings.

BRIEF DESCRIPTION OF THE DRAWINGS

FIG. 3 is an exploded perspective view of FIG. 2;

FIGS. 8A and 8B are plan views of the indicator of the present invention, shown providing navigation indications;

FIG. 14 is a schematic of the mirror assembly, with the sensor and controller integrated into the mirror head;

FIG. 15 is a schematic of the mirror assembly, with the sensor located external the mirror head;

FIG. 16 is a schematic of the mirror assembly, with the sensor and controller located external the mirror head;

FIGS. 18-21 are schematics showing example situations for actuation or non-actuation of the alert indicator.

DESCRIPTION OF THE PREFERRED EMBODIMENTS

Figure 1:
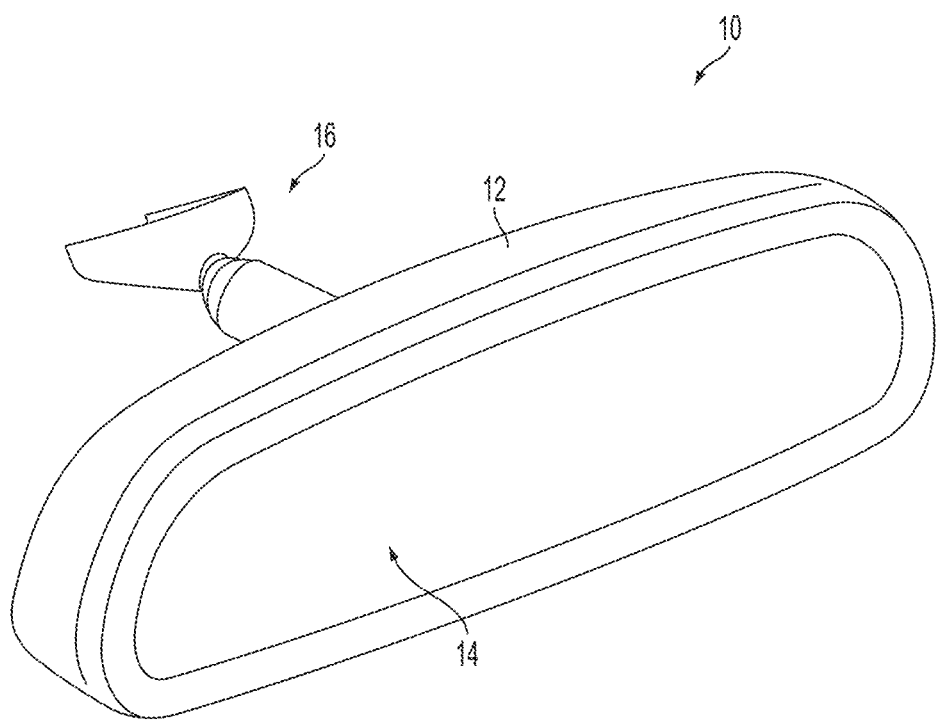
FIG. 1 is an exploded perspective view of an interior rearview mirror assembly suitable for use with the indicator(s) of the present invention.
Figure 2:
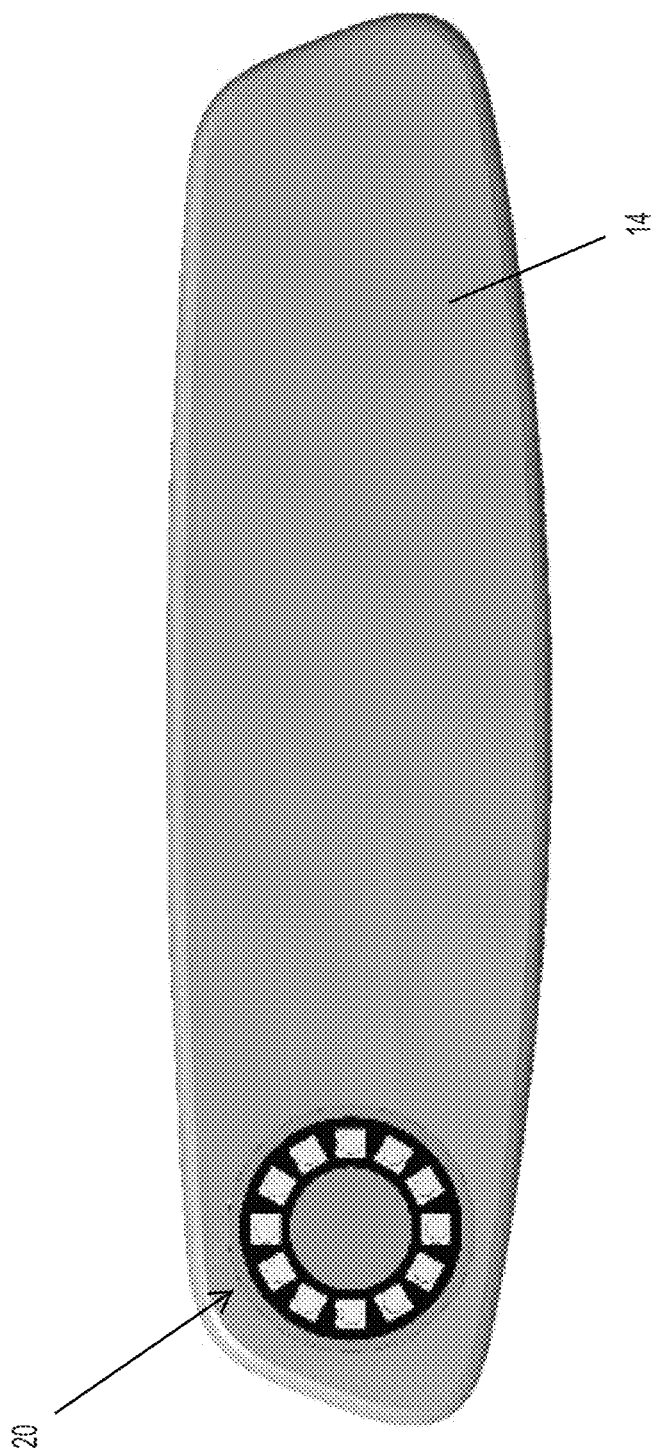
FIG. 2 is a plan view of the interior rearview mirror assembly, with an indicator viewable at the reflective element.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element may comprise a variable reflectance mirror reflective element that varies its reflectance responsive to electrical current applied to conductive coatings or layers of the reflective element.

The Interior rearview mirror assembly includes a display or indicator that is operable to emit different colors or patterns of light to indicate various functions or features or alerts. For example, and such as shown in FIGS. 2-10, the interior rearview mirror assembly includes an indicator 20 disposed behind the reflective element 14 and viewable (when actuated) through the reflective element (and substantially not viewable or discernible when not activated). The indicator 20 comprises a plurality of light emitting diodes that are selectively actuated in a particular color or colors or pattern to convey information to the driver of the vehicle. Once learned by the driver, the various signals or indicator patterns are readily recognizable and quickly discernible, such that the indicator does not cause a distraction to the driver.

The indicator may comprise any suitable shape and arrangement of light emitting diodes that may be individually operable to emit different color light. For example, the indicator may be ring-shaped (such as shown in FIGS. 2-10), or may be the shape of a vehicle or may be disposed about a periphery or side of the mirror reflective element, or the like. The indicator may convey information about various functions or accessories or the like, and/or may indicate to the driver to pay attention to driving (such as responsive to a driver monitoring system that determines that the driver is texting or otherwise not paying attention to driving the vehicle). The indicator may comprise a two dimensional array of LEDs, with individual ones or sets of LEDs selectively actuated to generate a desired pattern or icon or character (such as, for example, a particular set of LEDs being activated to generate an arrow shape for a turn signal indicator, or a particular set of LEDs being activated to generate a phone icon to indicate receipt of a call or message, or a particular set of LEDs being activated to generate a vehicle icon to indicate detection of a vehicle at a blind zone of the equipped vehicle, or the like).

The indicator thus may function to combine sensors and signals/indications/alerts (such as a blind zone indicator, turn signal indicator, navigation indicator, etc.) into a centralized location at the interior rearview mirror assembly. As shown in FIG. 3, the indicator comprises a ring of light emitting diodes (such as, for example, twelve light emitting diodes) disposed on a ring-shaped circuit element. A ring-shaped masking element may be disposed at or over the light emitting diodes to guide the light emitted by the light emitting diodes such that light emitted by respective ones of the light emitting diodes is only viewed at a respective location at the mirror reflective element.

As shown in FIG. 3, the mirror reflective element glass substrate may be configured to receive the ring thereat, or optionally, the mirror reflective element comprises a transflective mirror reflector, such that the indicator is disposed behind the reflective element and is only viewable through the reflective element when actuated. The indicator functions to provide various color patterns of light by selectively energizing respective ones of the light emitting diodes in a selected color, such that different patterns of light are viewable by the driver when the indicator is operating. Each light emitting diode of the indicator may be operable to emit light of a respective color or may be operable to emit light of selected ones of a plurality of colors (e.g., each LED may be selectively operable to emit red light or green light or yellow light or blue light or white light or no light at all, depending on the trigger).

Figure 4:
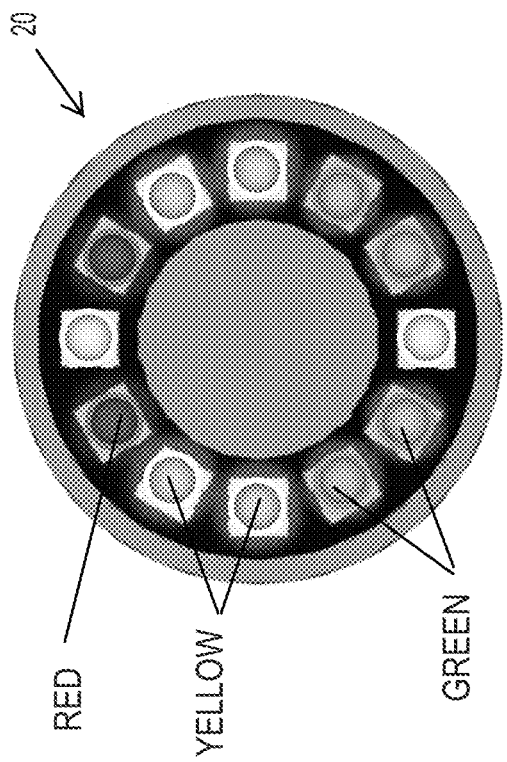
FIG. 4 is a plan view of the indicator of the present invention, shown providing a blind zone indication.

For example, and such as shown in FIG. 4, the indicator may function as a blind zone indicator and may communicate more information about another vehicle's location within the driver's blind spot. For example, if the other vehicle is detected rearward of the subject vehicle, the two lower LEDs at the respective side of the indicator may be energized to emit green light, while if the other vehicle is close to the subject vehicle at the blind spot, the next two LEDs at the respective side of the indicator may be energized to emit yellow light, and if the other vehicle is adjacent to the subject vehicle (and/or if the driver actuates a turn signal indicator toward the side where the other vehicle is detected), the next upper LED at the respective side of the indicator may be energized to emit red light. Optionally, the indicator may emit similar patterns of light to assist in parking the vehicle (so as to function with a curb sensor and/or a parking assist system of the vehicle).

Figure 5:
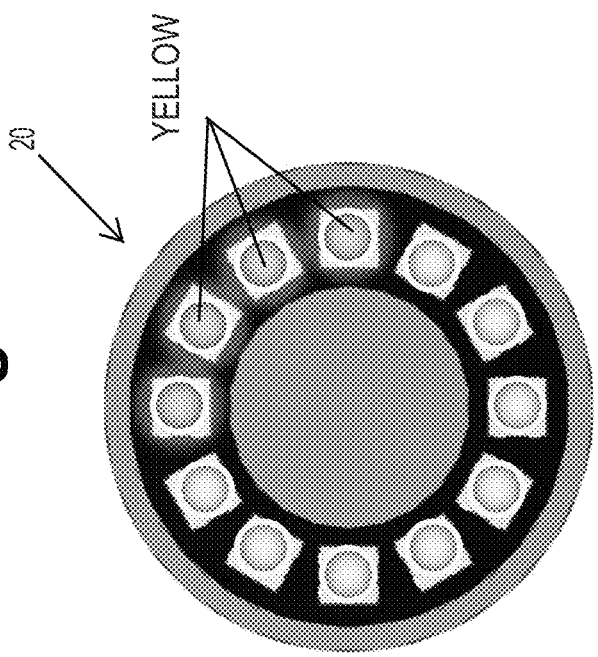
FIG. 5 is a plan view of the indicator of the present invention, shown providing a turn signal indication.

Optionally, and such as shown in FIG. 5, the indicator may provide a turn signal indication feature. For example, when the right turn signal indicator is actuated by the driver of the vehicle, the indicator 20 may energize or flash a plurality of LEDs at the right side of the indicator. Thus, the driver will be alerted that the turn signal indicator is actuated and will be less likely to leave the turn signal indicator on since the indication is not hidden in the vehicle instrument panel. Optionally, the indicator 20 may only actuate to show the turn signal actuation after the turn signal has been left on for a period of time.

Figure 6:
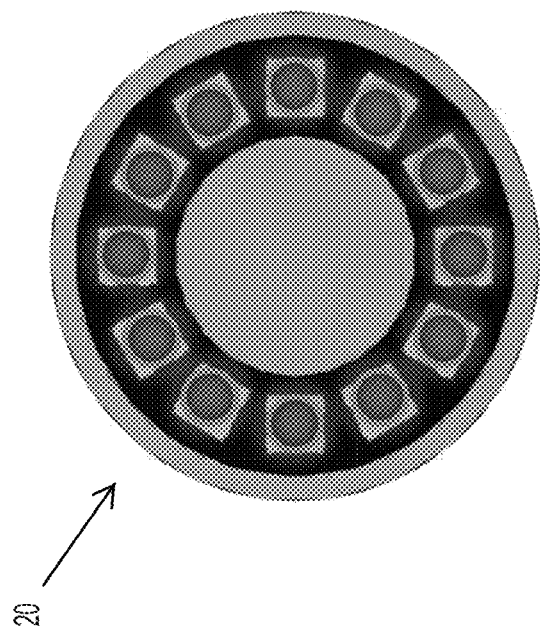
FIG. 6 is a plan view of the indicator of the present invention, shown providing a vehicle alarm indication.

Optionally, and such as shown in FIG. 6, the indicator 20 may also function as a vehicle alarm alert where the indicator flashes the LEDs so as to intermittently emit red light to indicate that a vehicle alarm system is activated. The indicator may flash the red LEDs to deter vehicle break-in (such as responsive to detection of a person exterior the vehicle) or may flash or episodically actuate the LEDs to indicate that a security system of the vehicle is activated.

Figure 7:
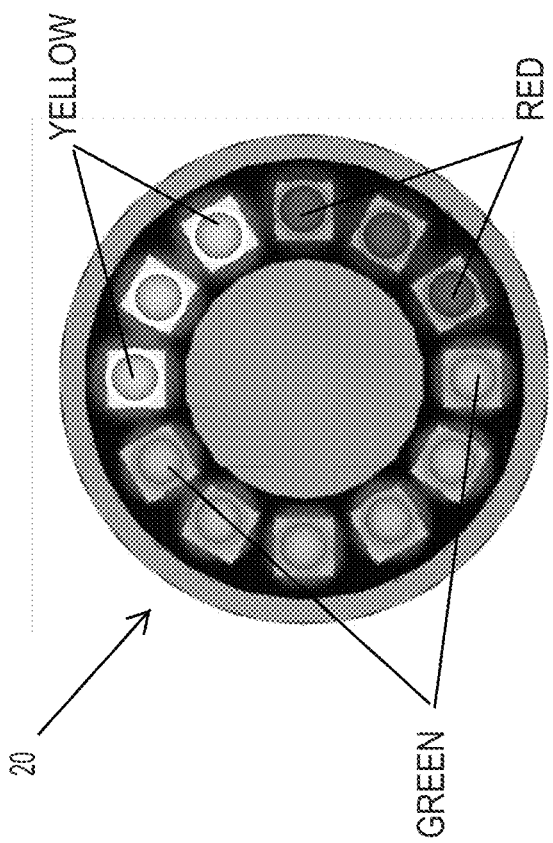
FIG. 7 is a plan view of the indicator of the present invention, shown providing a visual speedometer indication.

Optionally, and such as shown in FIG. 7, the indicator 20 may actuate or energize the LEDs in different colors (such as green, yellow and red) to indicate when the vehicle is traveling at or above the posted speed limits. For example, if the vehicle speed is at or below the posted speed limit, some of the LEDs may emit green light, and when the vehicle speed is at or slightly above the posted speed limit, some of the LEDs may emit yellow light, and when the vehicle speed is substantially above the posted speed limit, some of the LEDs may emit red light. Optionally, the indicator may provide similar indications pertaining to the current fuel economy of the vehicle.

Optionally, and such as shown in FIGS. 8A and 8B, the indicator 20 may operate in conjunction with a vehicle navigation system and may provide signals to indicate to the driver the next approaching driving maneuver. For example, if the route being navigated requires an upcoming right turn, the indicator 20 may actuate the LEDs to emit the green and white pattern of FIG. 8B, while if the route being navigated requires an upcoming right turn, the indicator 20 may actuate the LEDs to emit the red and white pattern of FIG. 8A. Other patterns may be emitted for different turns or maneuvers.

Figure 9:
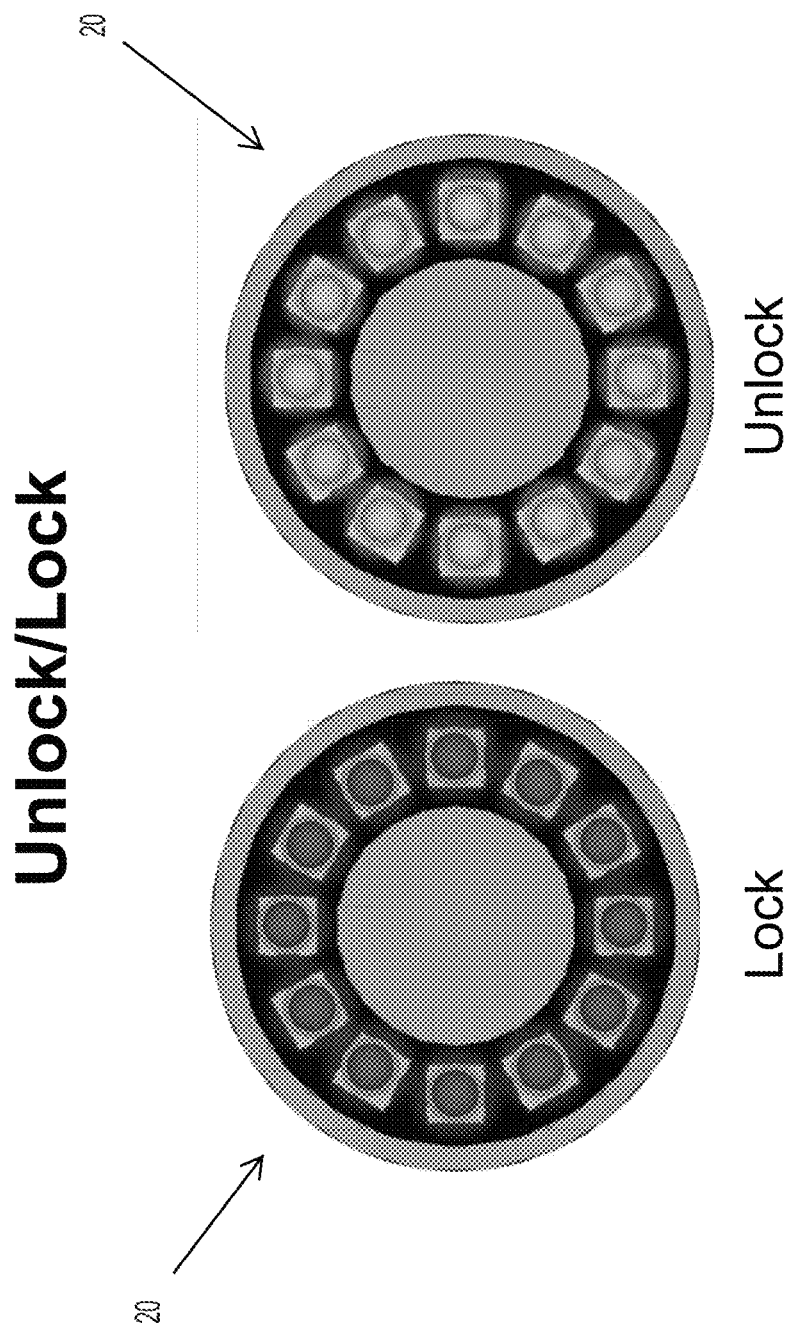
FIG. 9 is a plan view of the indicator of the present invention, shown providing a door lock/unlock indication.

Optionally, and such as shown in FIG. 9, the indicator 20 may operate to communicate to the driver that the vehicle is locked (e.g., all LEDs emitting red light) or unlocked (e.g., all LEDs emitting green light).

Figure 10:
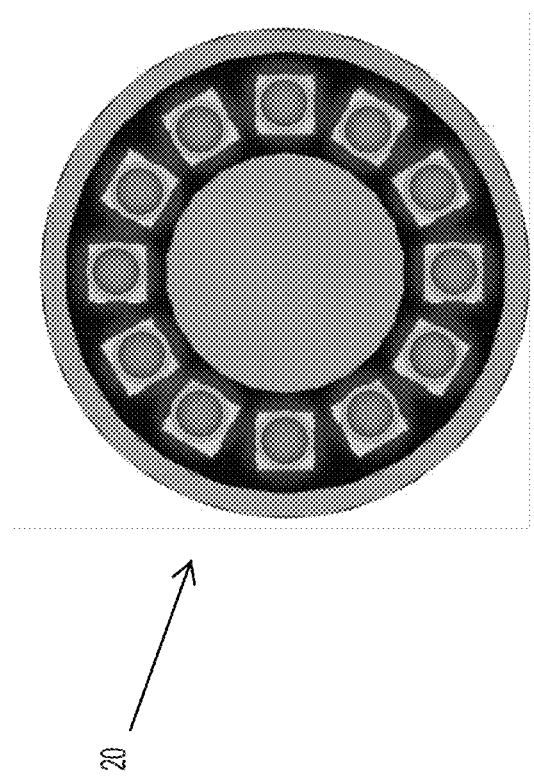
FIG. 10 is a plan view of the indicator of the present invention, shown providing an incoming call/message indication.
Figure 11:
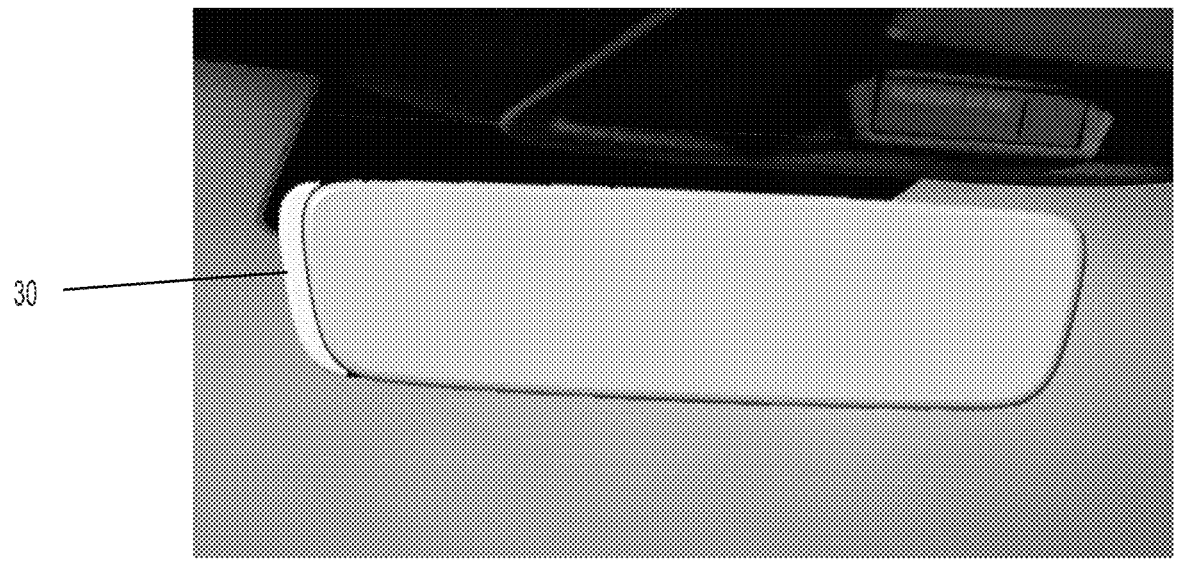
FIGS. 11 and 12 are perspective views of another interior rearview mirror assembly, having an alert indicator of the present invention.
Figure 12:

Optionally, and such as shown in FIG. 10, the indicator 20 may operate to provide call and messaging alert notifications. For example, the indicator may energize some or all of the LEDs to emit blue light when a call or text is received (such as at the vehicle telematics system or at the driver's smart phone that is in communication with one or more systems or accessories of the vehicle, such as via a wireless BLUETOOTH® communication link or the like.

Thus, the indicator of the present invention is reconfigurable to emit different colors or patterns of light to convey information about different accessories or systems of the vehicle, such as for turn signal indication, blind zone detection, vehicle speed, communication status and/or the like. Although shown and described as being disposed at an interior rearview mirror assembly of a vehicle, the indicator may also or otherwise be disposed at one or both exterior rearview mirror assemblies of the vehicle and may provide or convey information pertinent to a driver viewing the respective exterior rearview mirror assembly.

Optionally, the interior rearview mirror assembly may also or otherwise include an alert indicator that provides a visual alert during high deceleration situations or detected near or imminent collisions or the like. For example, and such as shown in FIGS. 11-22, an interior rearview mirror assembly includes an alert indicator 30 that provides an alert responsive to a determination of a potential collision with another vehicle. For example, the indicator system may comprise a sensor and LED display integrated into the interior rearview mirror assembly. The sensor comprises a forward sensing sensor (such as a radar or lidar or ultrasonic or image-based sensor) that senses forward of the vehicle and determines (via processing of sensor data sensed or captured by the sensor) when another vehicle or object is present ahead of the subject vehicle and in a potential collision path. Responsive to determination that the subject vehicle is approaching another vehicle at a dangerous rate or at a rate above a threshold rate for the determined distance and relative speeds of the other vehicle.

Figure 13:
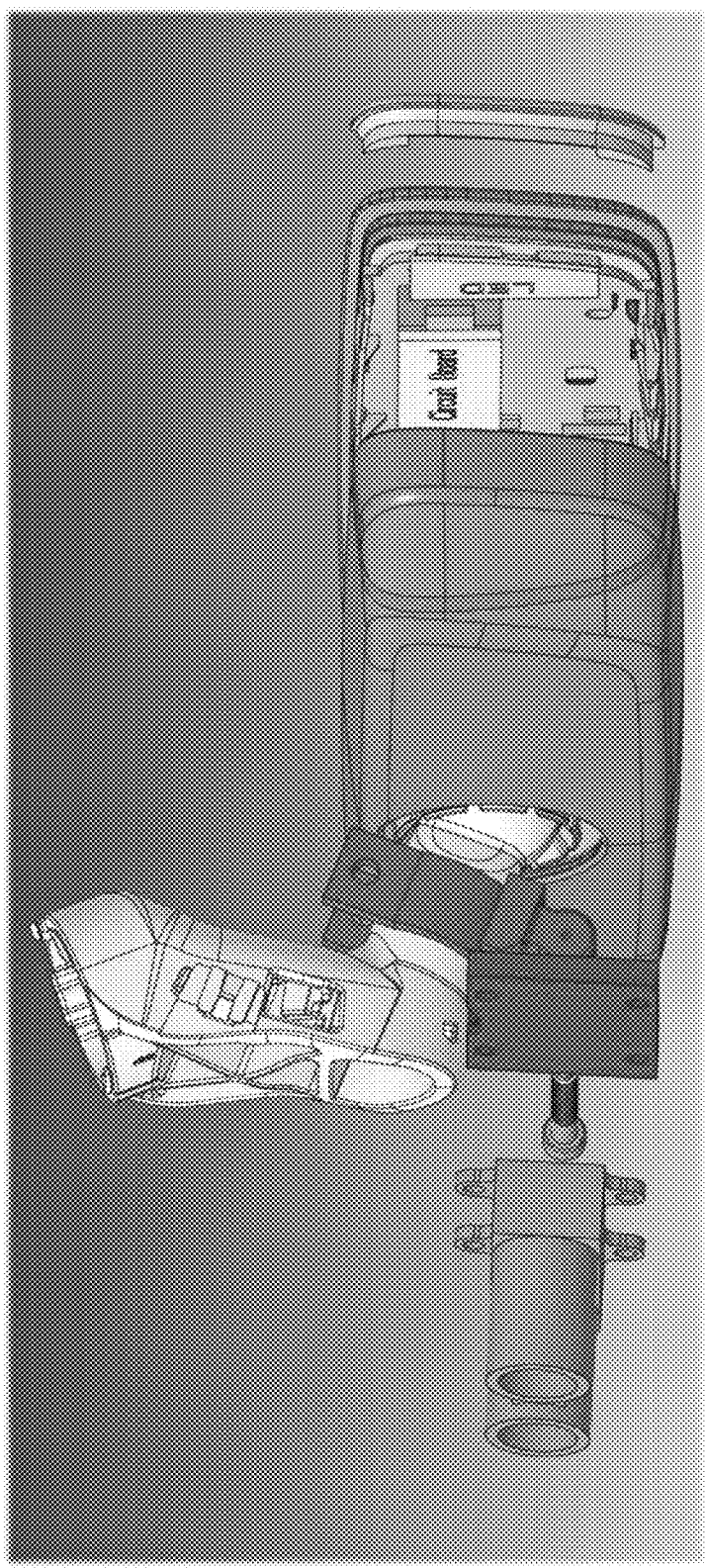
FIG. 13 is an exploded perspective view of the mirror assembly of FIGS. 11 and 12.
Figure 17:
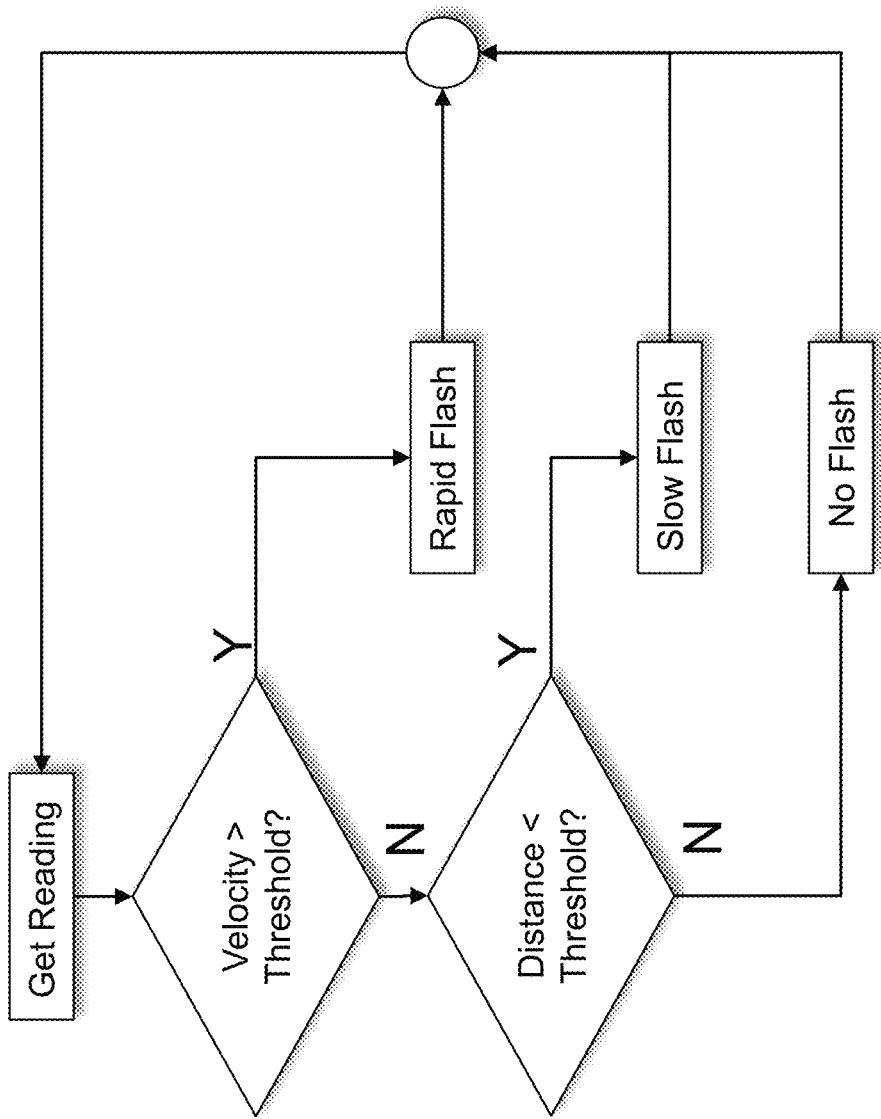
FIG. 17 is a block diagram of the alert system of the present invention.
Figure 20:
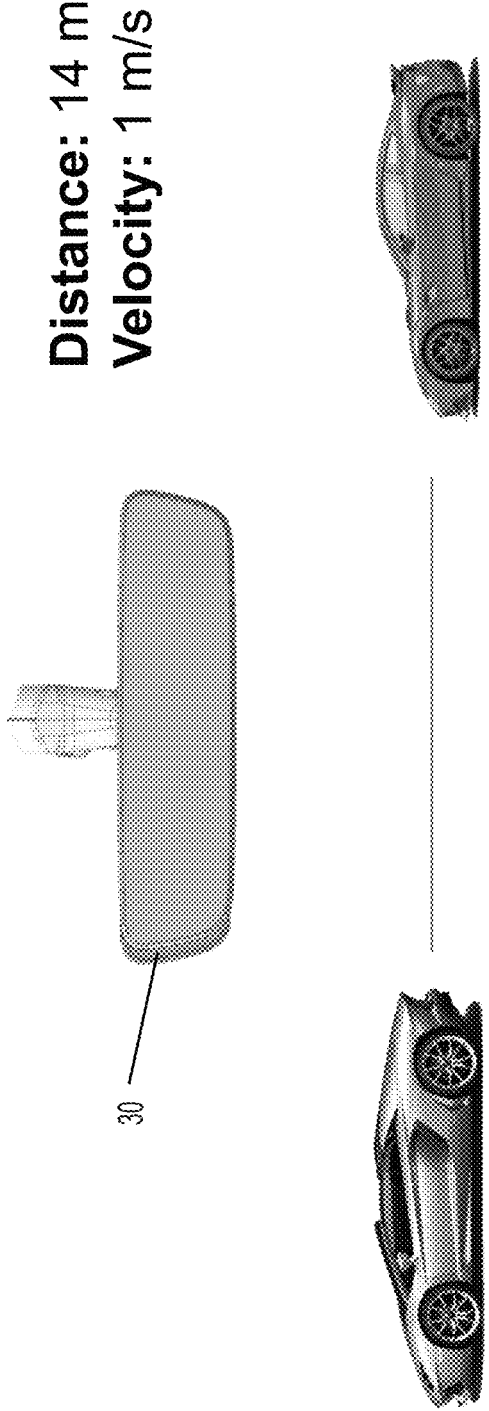
Figure 21:
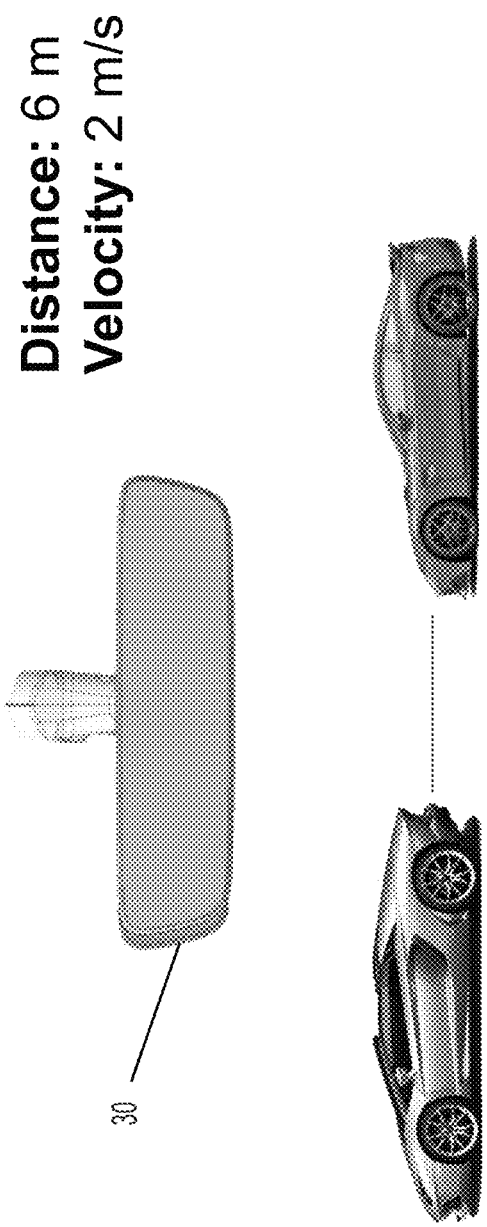

As shown in FIG. 13, the system includes an interior rearview mirror assembly with an extended rear cover or casing, and with a lidar sensor. The indicator may comprise one or more light emitting diodes (such as, for example, three LEDs) disposed at a circuit board, with a lens or cover element disposed at an outer periphery of the mirror casing and reflective element (such as at the driver's side of the rearview mirror assembly, so that the indicator, when actuated, is readily viewable and discernible by the driver). As shown in FIG. 14, the sensor may be integrated in the mirror, where a microcontroller receives sensor data from the sensor and power and vehicle speed information (such as via a vehicle communication bus or the like), and actuates the LEDs accordingly. Optionally, and such as shown in FIG. 15, the sensor may be external the mirror assembly, whereby the vehicle speed information and sensor data may be provided to the controller via the vehicle communication bus. Optionally, and such as shown in FIG. 16, the sensor and controller may be external the mirror assembly, whereby the control signal to the LEDs is provided from the controller via the vehicle communication bus.

As shown in FIGS. 17-21, the system receives or gathers distance information and the controller calculates the vehicle's approach rate to determine if there is a condition or situation where an alert is appropriate. For example, the system may determine when the approach velocity is above a threshold level, and when such determination is made, the system may rapidly flash the indicator to alert the driver (see FIG. 21). If the approach velocity is below the threshold level, but the distance is below a threshold distance, then the system may slowly flash the indicator to alert the driver (see FIG. 20). If the approach velocity is below a threshold level, and the distance is greater than a threshold level, the system may not flash or activate the indicator (see FIGS. 18 and 19).

Thus, the indicator provides an LED indication at a location where the driver can readily see the indicator when the driver is looking forward. Although shown at the driver side of the mirror head, the indicator may be positioned elsewhere at the mirror assembly, such as at the outer rim of the glass substrate or behind the mirror reflective element and viewable through the mirror reflective element. The sensor may be disposed at the mirror assembly or elsewhere at the vehicle. The sensor may comprise one or more of a forward viewing camera, a Radar sensor, a Lidar sensor, an ultrasonic sensor or sonar sensor, or the system may operate responsive to communications from a remote location via a V2V (vehicle-to-vehicle) communication system or a V2X (vehicle-to-infrastructure) communication system or the like. Optionally, the indicator may actuate responsive to a rearward sensing sensor and controller that determines when another vehicle is approaching at a high approach rate from rearward of the subject vehicle.

The indicators and sensing systems of the present invention may utilize aspects of the indicators and sensing systems and mirror assemblies described in U.S. Pat. Nos. 9,126,525; 9,092,986; 8,217,830; 8,027,029 and/or 5,530,240, which are hereby incorporated herein by reference in their entireties.

The mirror reflective element may utilize aspects of the mirror reflective element assemblies described in U.S. Pat. Nos. 7,626,749; 7,274,501; 7,255,451; 7,195,381; 7,184,190; 6,690,268; 5,140,455; 5,151,816; 5,066,112; 6,449,082; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties.

The mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties). Optionally, the mirror assembly may comprise a reflective element nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

Optionally, the mirror assembly may include one or more displays and/or display elements, which may comprise display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The indicator may be controlled or operable in response to an input or signal, such as a signal received from one or more sensors, such as radar sensors or lidar sensors or cameras or image sensors of the vehicle, such as a video camera or sensor, such as a CMOS imaging array sensor, a CCD sensor or the like, and image processors or image processing techniques, such as utilizing aspects of the systems described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a mirror casing;
   a mirror reflective element disposed at said mirror casing;
   a mounting structure configured to adjustably mount said mirror reflective element and said mirror casing at an interior portion of a vehicle equipped with said interior rearview mirror assembly;
   an indicator disposed at said mirror reflective element;
   wherein said indicator comprises a plurality of light emitting diodes, and wherein each light emitting diode of said plurality of light emitting diodes is individually operated to emit light;
   wherein at least one light emitting diode of said plurality of light emitting diodes is at each of (i) an upper left region of said indicator, (ii) an upper right region of said indicator, (iii) a middle left region of said indicator, (iv) a middle right region of said indicator, (v) a lower left region of said indicator and (vi) a lower right region of said indicator;
   wherein, with said mirror reflective element and said mirror casing adjustably mounted at the interior portion of the equipped vehicle via said mounting structure, and responsive to one of a plurality of triggers, said indicator electrically powers a particular one or particular ones of said plurality of light emitting diodes for that trigger, and wherein said indicator electrically powers the particular one or particular ones of said plurality of light emitting diodes to emit light to convey information associated with that trigger to a driver of the equipped vehicle;
   wherein one of the plurality of triggers comprises a blind zone detection system of the equipped vehicle, and wherein, with said mirror reflective element and said mirror casing adjustably mounted at the interior portion of the equipped vehicle via said mounting structure, said indicator provides a blind zone indication by powering at least one light emitting diode of said plurality of light emitting diodes responsive to the blind zone detection system of the equipped vehicle; and
   wherein said indicator provides the blind zone indication by (i) powering the at least one light emitting diode at the upper left region of said indicator responsive to detection of another vehicle sideward of the equipped vehicle and in a left side lane to the left of the equipped vehicle, (ii) powering the at least one light emitting diode at the upper right region of said indicator responsive to detection of another vehicle sideward of the equipped vehicle and in a right side lane to the right of the equipped vehicle, (iii) powering the at least one light emitting diode at the middle left region of said indicator responsive to detection of another vehicle in the left side lane at a left-side driver's blind zone region when the driver views sideward and rearward of the equipped vehicle using a left-side exterior rearview mirror, (iv) powering the at least one light emitting diode at the middle right region of said indicator responsive to detection of another vehicle in the right side lane at a right-side driver's blind zone region when the driver views sideward and rearward of the equipped vehicle using a right-side exterior rearview mirror, (v) powering the at least one light emitting diode at the lower left region of said indicator responsive to detection of another vehicle in the left side lane rearward of the equipped vehicle and (vi) powering the at least one light emitting diode at the lower right region of said indicator responsive to detection of another vehicle in the right side lane rearward of the equipped vehicle.

2. The interior rearview mirror assembly of claim 1, wherein said indicator is disposed behind said mirror reflective element, and wherein, when said indicator electrically powers said plurality of light emitting diodes, light emitted by the powered light emitting diodes passes through said mirror reflective element so as to be viewable by the driver of the equipped vehicle.

3. The interior rearview mirror assembly of claim 1, wherein said indicator comprises a ring-shaped indicator with said plurality of light emitting diodes arranged in a circular shape.

4. The interior rearview mirror assembly of claim 3, wherein said indicator provides a turn signal indication by powering two or more of said plurality of light emitting diodes at at least the middle left region or the middle right region of said ring-shaped indicator.

5. The interior rearview mirror assembly of claim 1, wherein another one of the plurality of triggers comprises actuation of a turn signal of the equipped vehicle, and wherein, with said mirror reflective element and said mirror casing adjustably mounted at the interior portion of the equipped vehicle via said mounting structure, said indicator provides a turn signal indication by powering light emitting diodes at at least the middle left region or the middle right of said indicator to emit yellow light responsive to actuation of the turn signal of the equipped vehicle.

6. The interior rearview mirror assembly of claim 1, wherein, with said mirror reflective element and said mirror casing adjustably mounted at the interior portion of the equipped vehicle via said mounting structure, said indicator provides the blind zone indication by (i) powering the at least one light emitting diode at the lower left region or the lower right region of said indicator to emit green light responsive to detection of another vehicle in the left or right side lane rearward of the equipped vehicle, (ii) powering the at least one light emitting diode at the middle left region or the middle right region of said indicator to emit yellow light responsive to detection of another vehicle in the side lane at the left-side or right-side driver's blind zone region, and (iii) powering the at least one light emitting diode at the upper left region or the upper right region of said indicator to emit red light responsive to detection of another vehicle sideward of the equipped vehicle and in the side lane to the left or right of the equipped vehicle.

7. The interior rearview mirror assembly of claim 1, wherein another one of the plurality of triggers comprises a security system of the equipped vehicle, and wherein, with said mirror reflective element and said mirror casing adjustably mounted at the interior portion of the equipped vehicle via said mounting structure, said indicator provides a vehicle security alert by powering at least some of said plurality of light emitting diodes to emit red light responsive to the security system of the equipped vehicle.

8. The interior rearview mirror assembly of claim 1, wherein another one of the plurality of triggers comprises a door lock/unlock signal, and wherein, with said mirror reflective element and said mirror casing adjustably mounted at the interior portion of the equipped vehicle via said mounting structure, said indicator provides a door lock indication by powering at least some of said plurality of light emitting diodes to emit red light responsive to the doors of the equipped vehicle being locked, and wherein said indicator provides a door unlock indication by powering at least some of said plurality of light emitting diodes to emit green light responsive to the doors of the equipped vehicle being unlocked.

9. The interior rearview mirror assembly of claim 1, wherein another one of the plurality of triggers comprises a communication system of the equipped vehicle, and wherein, with said mirror reflective element and said mirror casing adjustably mounted at the interior portion of the equipped vehicle via said mounting structure, said indicator provides a communication indication by powering at least some of said plurality of light emitting diodes to emit blue light responsive to an incoming call or message received by a user's cell phone or a telematics system of the equipped vehicle.

10. The interior rearview mirror assembly of claim 1, comprising an alert indicator at a driver side region of said mirror assembly, wherein, with said mirror reflective element and said mirror casing adjustably mounted at the interior portion of the equipped vehicle via said mounting structure, said alert indicator emits light responsive to determination, via a collision avoidance system of the equipped vehicle, of a rapid approach of another vehicle.

11. The interior rearview mirror assembly of claim 10, wherein said alert indicator is responsive to a forward sensing sensor.

12. The interior rearview mirror assembly of claim 11, wherein said interior rearview mirror assembly comprises said forward sensing sensor.

13. An interior rearview mirror assembly for a vehicle, said interior rearview mirror assembly comprising:
    a mirror casing;
    a mirror reflective element disposed at said mirror casing;
    a mounting structure configured to adjustably mount said mirror reflective element and said mirror casing at an interior portion of a vehicle equipped with said interior rearview mirror assembly;
    an indicator disposed behind said mirror reflective element;
    wherein said indicator comprises a plurality of light emitting diodes, and wherein each light emitting diode of said plurality of light emitting diodes is individually operated to emit light;
    wherein said indicator comprises a ring-shaped indicator with said plurality of light emitting diodes arranged in a circular shape;
    wherein at least one light emitting diode of said plurality of light emitting diodes is at each of (i) an upper left region of said indicator, (ii) an upper right region of said indicator, (iii) a middle left region of said indicator, (iv) a middle right region of said indicator, (v) a lower left region of said indicator and (vi) a lower right region of said indicator;
    wherein, with said mirror reflective element and said mirror casing adjustably mounted at the interior portion of the equipped vehicle via said mounting structure, and responsive to one of a plurality of triggers, said indicator electrically powers a particular one or particular ones of said plurality of light emitting diodes for that trigger, and wherein said indicator electrically powers the particular one or particular ones of said plurality of light emitting diodes to emit light of one or more colors to convey colored information associated with that trigger to a driver of the equipped vehicle;
    wherein each light emitting diode of said plurality of light emitting diodes is operable to emit red light, green light, yellow light, blue light or white light, and wherein a particular one or particular ones of said plurality of light emitting diodes is operable to emit a particular color of light or particular colors of light associated with a respective trigger of the plurality of triggers;
    wherein, when said indicator electrically powers said plurality of light emitting diodes, light emitted by the powered light emitting diodes passes through said mirror reflective element so as to be viewable by the driver of the equipped vehicle;
    wherein the plurality of triggers comprises triggers selected from the group consisting of (i) a signal indicative of locking or unlocking a vehicle door, (ii) a signal indicative of an incoming phone call or message, (iii) a signal indicative of navigation instructions from a navigation system of the equipped vehicle, (iv) a signal indicative of a speed of the equipped vehicle and (v) an output of a blind zone detection system of the equipped vehicle;
    wherein one of the plurality of triggers comprises the output of the blind zone detection system of the equipped vehicle, and wherein, with said mirror reflective element and said mirror casing adjustably mounted at the interior portion of the equipped vehicle via said mounting structure, said indicator provides a blind zone indication by powering at least one light emitting diode of said plurality of light emitting diodes responsive to the output of the blind zone detection system of the equipped vehicle; and
    wherein said indicator provides the blind zone indication by (i) powering the at least one light emitting diode at the upper left region of said indicator to emit red light responsive to detection of another vehicle sideward of the equipped vehicle and in a left side lane to the left of the equipped vehicle, (ii) powering the at least one light emitting diode at the upper right region of said indicator to emit red light responsive to detection of another vehicle sideward of the equipped vehicle and in a right side lane to the right of the equipped vehicle, (iii) powering the at least one light emitting diode at the middle left region of said indicator to emit yellow light responsive to detection of another vehicle in the left side lane at a left-side driver's blind zone region when the driver views sideward and rearward of the equipped vehicle using a left-side exterior rearview mirror, (iv) powering the at least one light emitting diode at the middle right region of said indicator to emit yellow light responsive to detection of another vehicle in the right side lane at a right-side driver's blind zone region when the driver views sideward and rearward of the equipped vehicle using a right-side exterior rearview mirror, (v) powering the at least one light emitting diode at the lower left region of said indicator to emit green light responsive to detection of another vehicle in the left side lane rearward of the equipped vehicle and (vi) powering the at least one light emitting diode at the lower right region of said indicator to emit green light responsive to detection of another vehicle in the right side lane rearward of the equipped vehicle.

14. The interior rearview mirror assembly of claim 13, wherein, with said mirror reflective element and said mirror casing adjustably mounted at the interior portion of the equipped vehicle via said mounting structure, the trigger comprises a signal indicative of locking or unlocking a vehicle door of the equipped vehicle, and wherein said indicator powers at least some of said plurality of light emitting diodes to emit red light responsive to the vehicle doors of the equipped vehicle being locked, and wherein said indicator powers at least some of said plurality of light emitting diodes to emit green light responsive to the vehicle doors of the equipped vehicle being unlocked.

15. The interior rearview mirror assembly of claim 13, wherein, with said mirror reflective element and said mirror casing adjustably mounted at the interior portion of the equipped vehicle via said mounting structure, the trigger comprises a signal indicative of an incoming phone call or message, and wherein said indicator powers at least some of said plurality of light emitting diodes to emit blue light responsive to an incoming call or message received by a user's cell phone or a telematics system of the equipped vehicle.

16. The interior rearview mirror assembly of claim 13, wherein, with said mirror reflective element and said mirror casing adjustably mounted at the interior portion of the equipped vehicle via said mounting structure, the trigger comprises a signal indicative of navigation instructions from a navigation system of the equipped vehicle, and wherein said indicator powers at least some of said plurality of light emitting diodes to emit a pattern of light that is indicative of a turn instruction for the driver to follow for a planned route of the navigation system.

17. The interior rearview mirror assembly of claim 13, wherein, with said mirror reflective element and said mirror casing adjustably mounted at the interior portion of the equipped vehicle via said mounting structure, the trigger comprises a signal indicative of speed of the equipped vehicle, and wherein said indicator powers at least some of said plurality of light emitting diodes to emit yellow light when speed of the equipped vehicle exceeds a speed limit for the road along which the equipped vehicle is traveling.

18. An interior rearview mirror assembly for a vehicle, said interior rearview mirror assembly comprising:

a mirror casing;

a mirror reflective element disposed at said mirror casing;

a mounting structure configured to adjustably mount said mirror reflective element and said mirror casing at an interior portion of a vehicle equipped with said interior rearview mirror assembly;

an indicator disposed behind said mirror reflective element;

wherein said indicator comprises a plurality of light emitting diodes, and wherein each light emitting diode of said plurality of light emitting diodes is individually operated to emit light;

wherein said indicator comprises a ring-shaped indicator with said plurality of light emitting diodes arranged in a circular shape;

wherein at least one light emitting diode of said plurality of light emitting diodes is at each of (i) an upper left region of said indicator, (ii) an upper right region of said indicator, (iii) a middle left region of said indicator, (iv) a middle right region of said indicator, (v) a lower left region of said indicator and (vi) a lower right region of said indicator;

wherein, with said mirror reflective element and said mirror casing adjustably mounted at the interior portion of the equipped vehicle via said mounting structure, and responsive to one of a plurality of triggers, said indicator electrically powers a particular one or particular ones of said plurality of light emitting diodes for that trigger, and wherein said indicator electrically powers the particular one or particular ones of said plurality of light emitting diodes to emit light of one or more particular colors to convey colored information associated with that trigger to a driver of the equipped vehicle;

wherein, when said indicator electrically powers said plurality of light emitting diodes, light emitted by the powered light emitting diodes passes through said mirror reflective element so as to be viewable by the driver of the equipped vehicle;

wherein one of the plurality of triggers comprises actuation of a turn signal of the equipped vehicle, and wherein, with said mirror reflective element and said mirror casing adjustably mounted at the interior portion of the equipped vehicle via said mounting structure, said indicator provides, responsive to actuation of the turn signal of the equipped vehicle, a turn signal indication by powering two or more of said plurality of light emitting diodes at at least the middle left region or the middle right region of said ring-shaped indicator;

wherein another one of the plurality of triggers comprises a blind zone detection system of the equipped vehicle, and wherein, with said mirror reflective element and said mirror casing adjustably mounted at the interior portion of the equipped vehicle via said mounting structure, said indicator provides a blind zone indication by powering at least one light emitting diode of said plurality of light emitting diodes responsive to a blind zone detection system of the equipped vehicle; and wherein said indicator provides the blind zone indication by (i) powering the at least one light emitting diode at the upper left region of said indicator responsive to detection of another vehicle sideward of the equipped vehicle and in a left side lane to the left of the equipped vehicle, (ii) powering the at least one light emitting diode at the upper right region of said indicator responsive to detection of another vehicle sideward of the equipped vehicle and in a right side lane to the right of the equipped vehicle, (iii) powering the at least one light emitting diode at the middle left region of said indicator responsive to detection of another vehicle in the left side lane at a left-side driver's blind zone region when the driver views sideward and rearward of the equipped vehicle using a left-side exterior rearview mirror, (iv) powering the at least one light emitting diode at the middle right region of said indicator responsive to detection of another vehicle in the right side lane at a right-side driver's blind zone region when the driver views sideward and rearward of the equipped vehicle using a right-side exterior rearview mirror, (v) powering the at least one light emitting diode at the lower left region of said indicator responsive to detection of another vehicle in the left side lane rearward of the equipped vehicle and (vi) powering the at least one light emitting diode at the lower right region of said indicator responsive to detection of another vehicle in the right side lane rearward of the equipped vehicle.

19. The interior rearview mirror assembly of claim 18, wherein said indicator provides the turn signal indication by powering the two or more of said plurality of light emitting diodes at at least the middle left region or the middle right region of said indicator to emit yellow light responsive to actuation of the turn signal of the equipped vehicle at that side of the equipped vehicle.

20. The interior rearview mirror assembly of claim 18, wherein, with said mirror reflective element and said mirror casing adjustably mounted at the interior portion of the equipped vehicle via said mounting structure, said indicator provides the blind zone indication by (i) powering the at least one light emitting diode at the lower left region or the lower right region of said indicator to emit green light responsive to detection of another vehicle in the left or right side lane rearward of the equipped vehicle, (ii) powering the at least one light emitting diode at the middle left region or the middle right region of said indicator to emit yellow light responsive to detection of another vehicle in the side lane at the left-side or right-side driver's blind zone region, and (iii) powering the at least one light emitting diode at the upper left region or the upper right region of said indicator to emit red light responsive to detection of another vehicle sideward of the equipped vehicle and in the side lane to the left or right of the equipped vehicle.

21. The interior rearview mirror assembly of claim 18, wherein each light emitting diode of said plurality of light emitting diodes is operable to emit red light, green light, yellow light, blue light or white light, and wherein a particular one or particular ones of said plurality of light emitting diodes is operable to emit a particular color of light or particular colors of light associated with a respective trigger of the plurality of triggers.

22. The interior rearview mirror assembly of claim 1, wherein each light emitting diode of said plurality of light emitting diodes is operable to emit red light, green light, yellow light, blue light or white light, and wherein a particular one or particular ones of said plurality of light emitting diodes is operable to emit a particular color of light or particular colors of light associated with a respective trigger of the plurality of triggers.

\* \* \* \* \*